United States Patent [19]
Chan

[11] Patent Number: 5,432,712
[45] Date of Patent: Jul. 11, 1995

[54] MACHINE VISION STEREO MATCHING

[75] Inventor: Kap-Luk Chan, Cambridge, Great Britain

[73] Assignee: Axiom Innovation Limited, London, England

[21] Appl. No.: 966,181

[22] PCT Filed: May 29, 1991

[86] PCT No.: PCT/GB91/00856

§ 371 Date: Jan. 29, 1993

§ 102(e) Date: Jan. 29, 1993

[87] PCT Pub. No.: WO91/19265

PCT Pub. Date: Dec. 12, 1991

[30] Foreign Application Priority Data

May 29, 1990 [GB] United Kingdom ............... 9011922
Dec. 28, 1991 [GB] United Kingdom ............... 9028124

[51] Int. Cl.$^6$ ..................... G06K 9/20; G06K 15/00
[52] U.S. Cl. ........................ 364/514 R; 364/516; 382/191; 382/199
[58] Field of Search ................ 358/88, 133; 364/559, 364/516, 514; 382/22, 14, 17

[56] References Cited

PUBLICATIONS

Medioni et al., Title "Segment-Based Stereo Matching", Computer Vision, Graphics, & Image Processing 31, 2–18 (1985).
Nasrabadi et al; Title "Stereo vision correspondence using a multichannel graph matching technique", 1988 IEEE pp. 1804–1809.
Pape, V.; Algovithm 562-Shortest Path Lengths [H]; ACM vol. 6, No. 3, Sep. 1980 pp. 450–455.

Primary Examiner—Ellis B. Ramirez
Assistant Examiner—Kamini S. Shah
Attorney, Agent, or Firm—Pollock, Vande Sande & Priddy

[57] ABSTRACT

Corresponding points in at least two different images of a scene are matched by the use of a shortest path analysis. An edge point in a continuous edge segment is selected in one image and potentially matching edge points in other images are arranged as a layered network. Weightings are applied to the potential matches and the best match is identified on the basis of a shortest path analysis of the network. In one preferred arrangement epipolar lines are used. For each edge point to be matched the position of the corresponding epipolar line is calculated using matrices defining parameters associated with the capturing of the image. The epipolar line is used to identify in the other image points as potential matches to the selected point in the one image. Further constraints are applied to the identified points to find the one point in the other image that most likely matches the selected point.

19 Claims, 4 Drawing Sheets

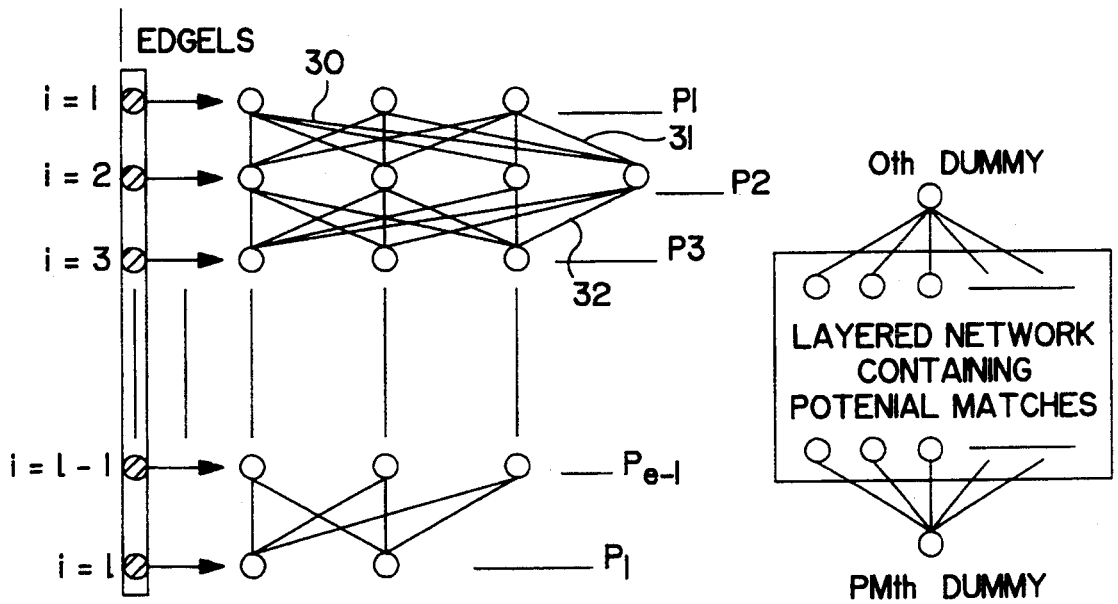

```
                      The matching algorithm
Begin
    select reference view;
    for all edge segments do begin
        for all reference edgels in a segment do begin
            search for potenial candidates along epipolar band.
            verify potenial candidates using intersection of epipolar lines
                and filtering constraints;
            If verified ok then
                enter it into network.
        end {do... loop};
        Using I-deque shortest path algorithm to find the best matches.
        record the best matches.
    end {do... loop};
end {begin}.
```

FIG. 7

MACHINE VISION STEREO MATCHING

FIELD OF THE INVENTION

The invention relates to machine vision stereo matching, i.e., the matching of features between two different images of a scene.

BACKGROUND

The matching of features in images representing a scene viewed from at least two different viewing positions is a major problem in stereo vision in the art of machine vision systems. To date, this problem has been approached by applying a set of constraints so that areas or features or both in two or more images are matched. This approach has met with varying degrees of success because there is no general solution to the problem and a set of constraints applied to one scene may not be appropriate to other scenes. Improperly applied constraints will lead to an interpretation of the images which does not correspond fully with the scene.

There is a reduction of one dimension when a three-dimensional (3D) scene is captured in a two-dimensional (2D) image. This dimensional reduction results in a loss of information about the scene because a point in the 2D image will correspond to a line in the 3D scene. Thus, the process of 2D image formation can be regarded as a many-to-one mapping. I.e., many points in the 3D space of the scene will map onto a single point in the 2D space of the image. Thus, the inverse operation of mapping 2D image space points onto 3D scene space points is a one-to-many mapping.

This loss of information can be and is avoided by using at least one further image of the scene taken from a different viewing position and then identifying corresponding points in the plural images that relate to the same point in the 3D space of the scene. In this way, the process of mapping 2D image space points on to 3D scene space points is reduced to a one-to-one mapping. However, in adopting this approach a new problem is created, namely, the problem of identifying corresponding points in the plural images, i.e., the correspondence problem. For any one pixel in one image, there will be a large number of possibly corresponding pixels in the or each other image, the extreme being every pixel in the other image being a possible match with the pixel in the first pixel, and there is of course only one correct corresponding pixel.

SUMMARY OF THE INVENTION

The present invention provides a means by which the number of possible matches is reduced, thereby both reducing the processing time required to find a match and increasing the likelihood of making a good match.

To obtain accurately triangulated 3D measurements from stereo images, a wide baseline, i.e., the separation between cameras, or in the case of convergent stereo images, a wide viewing angle is required. The correspondence problem is more severe in wide baseline/angle stereo images because the changes between pairs of images can be very large and this in turn makes matching of images more difficult. These changes can be categorized into two types, geometric distortion and photometric distortion. Geometric distortion is the change in the geometrical description of a matching entity between images. Photometric distortion is caused by the change in orientation of a surface of an object in relation to the viewing point when a scene is viewed from a different viewing position. The degree of both types of distortion increases with increased baseline or viewing angle between the two viewing positions, although photometric distortion is less significant when a scene is evenly illuminated. In an embodiment of the invention to be described in greater detail hereinafter, a compromise is made so that the matching of images is possible and at the same time the recovered 3D measurements are accurate enough for subsequent use.

Most stereo matching algorithms recognize a common problem, namely, that matching is only possible for those image points with distinctive image characteristics. Image points within homogeneous regions cannot be matched. In general, pixel or area based matching is more prone to image noise, whereas feature based matching suffers from both photometric and geometric distortions. The ambiguity of stereo matching can be decreased by increasing the sophistication of the image primitives used in matching.

The sophistication of matching primitives is, in ascending order:

(i) pixel or area;
(ii) edge pixels;
(iii) linear or curved edge segments; and
(iv) structural descriptions, i.e., shapes formed by edge segments.

Despite less matching ambiguity with higher level primitives, the pre-processing techniques commonly used to extract higher level primitives often produce artifacts which create problems additional to those that already exist.

The embodiment to be described uses edgels, i.e., edge pixels or elements, as the matching primitives. Current edge detection techniques are capable of producing edges to near sub-pixel accuracy, and accordingly the effect of geometric distortion and photometric distortion is not severe in edgel matching. This approach reduces the problem of identifying corresponding pixels to that of resolving the ambiguities posed by matching edgels. The embodiment uses as few constraints as possible in order to make the stereo algorithm more general. Matching constraints used in stereo can be classified into three groups: the geometrical constraints which are derived from the imaging geometry, the photometric constraints which are derived from the image characteristics, such as the intensity or color, and heuristics, such as the assumption of figural continuity.

In one aspect, the present invention provides a method of matching corresponding features in at least two different images representing a scene, the method comprising identifying in each image plural edge points which together form a continuous edge segment in the image; constructing for each edge segment in one image a layered network of potentially matching edge segments in the or each other image; and identifying the best match between segments on the basis of a shortest path analysis of the layered network.

Once potential corresponding points have been selected or defined, additional constraints can be applied to the points to describe the nature of those points. The constraints may be, for example, any or all of the potential matches lying on an epipolar line or characteristics such as the local edge orientation, the intensity normal and/or the surrounding color of the or each image point. In this way, the similarity between each potential point and the point of interest can be examined to facilitate selection of the best matching point from the potential points.

According to another aspect of the invention, there is provided a method of matching corresponding points in a plurality of images representing different aspects of a scene, the method comprising selecting points in one image, identifying in the or each other image points which are potential matches to each of the selected point, applying to each identified point in each other image a weighting representing the likelihood of the identified points matching the selected points and selecting as the best match to the selected points the combination of points which result in a minimal weighting summation.

According to a further aspect of the invention, there is provided a method of matching image points in at least two different images of a scene, the method comprising selecting an image point in one image and candidate matching image points in another image and applying a shortest path algorithm to the candidate matching points, thereby to identify a single point in the other image corresponding to the selected point in the one image.

International Patent Application No. WO89/01850, assigned to the present applicant, the teachings of which are incorporated herein by reference, discloses an adaptive vision-based controller in which, inter alia, an electronic camera acquires images representing a scene, which images can be processed to determine information related to the scene. The present invention can be incorporated into the system of this controller or indeed any other machine vision system.

Therefore, according to a further aspect of the invention, there is provided a system for matching corresponding features in at least two different images representing a scene, the system comprising means for identifying in each image plural edge points which together form a continuous edge segment in the image; constructing means for constructing for each edge segment in one image a layered network of potentially matching edge segments in the or each other image; and identifying means for identifying the best match between segments on the basis of a shortest path analysis of the layered network.

BRIEF DESCRIPTION OF THE DRAWINGS

The above and further features of the invention together with advantages thereof will become clearer from consideration of the following detailed description of exemplary embodiments of the invention given with reference to the accompanying drawings.

FIG. 5 shows the construction of a layered network of potential matches;

FIG. 6 illustrates how dummy layers can be added to the network of FIG. 5; and

FIG. 7 shows a matching algorithm.

DETAILED DESCRIPTION

Figure 1:
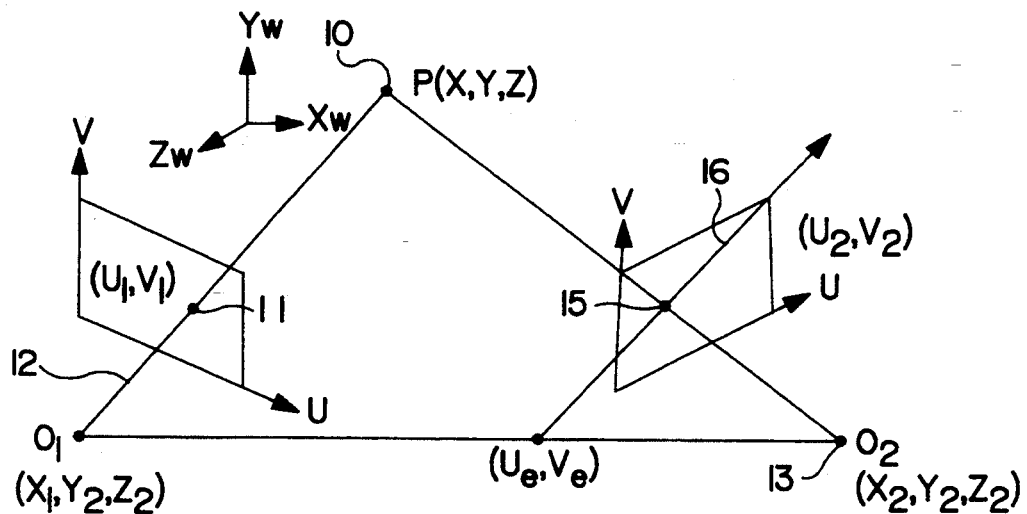
FIG. 1 is a representation of the geometry associated with two images of a scene.

FIG. 1 shows the geometry associated with stereo imaging. A point 10 in 3D space (x,y,z) is seen as a point 11 in a first image plane ($U_1$, $V_1$) when viewed from a first observation point $O_1$. In other words, the image plane ($U_1$, $V_1$) is in 3D space at a position such that a line 12 between the observation point $O_1$ and the point 10 will intersect the plane $U_1$, $V_1$ at the point 11. When the point 10 is viewed from a second observation point 13, a line 14 will intersect a second image plane ($U_2$, $V_2$) at a point 15 in the second image plane. The first line 12 will be seen in the second image plane ($U_2$, $V_2$) as an epipolar line 16.

Thus, the space in the second image plane ($U_2$, $V_2$) in which a point corresponding to the point 11 will lie can be reduced to the epipolar line 16. The use of an epipolar line in the second image reduces significantly the number of points in the second image that might correspond to a point in the first image, and this can be put to good effect either to reduce the processing time taken to match points and identify features or to increase the accuracy of confidence of a match of points and features between images.

Figure 2:
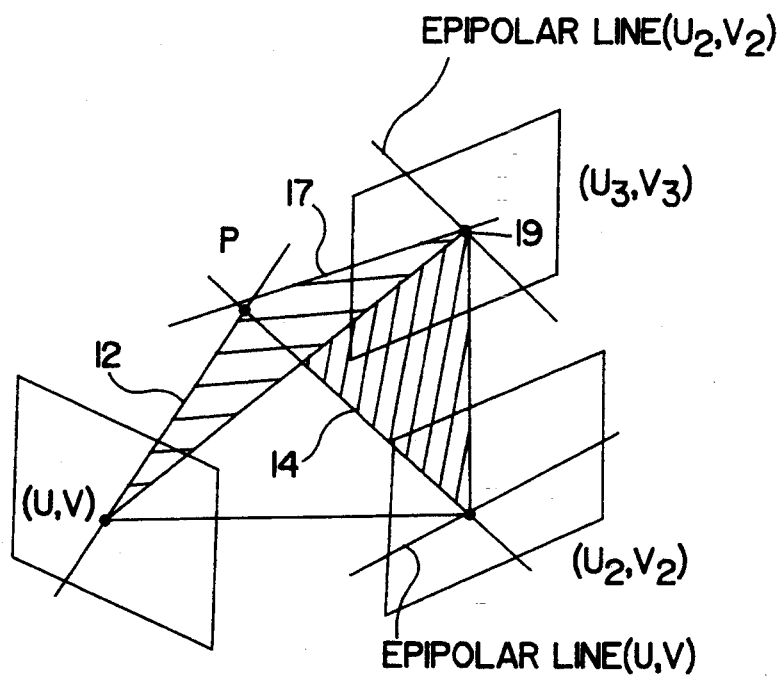
FIG. 2 is a representation of the geometry associated with three images of a scene.

As shown in FIG. 2, for more than two views of a scene all the notional lines 12, 14, 17 projected from the respective viewing positions (not shown) will intersect at the point 10 in the 3D space. The viewing positions can be selected so that at least two epipolar lines will be seen in at least one image. In the example shown in FIG. 2, the epipolar line 16 is seen in the second image plane ($U_2$, $V_c$) and the epipolar line 16, together with an epipolar line 18 resulting from the notional line 14, is seen in a third image plane ($U_3$, $V_3$). The point 19 at which the epipolar lines 16, 18 intersect in the third image plane ($U_3$, $V_3$) Corresponds to the point 10 in 3D space.

It is a simple matter to calculate the position of epipolar lines in the second and subsequent images, the problem being merely one of image geometry. The calculation of epipolar lines per se is considered to be well within the scope of those skilled in the art, but for the sake of completeness a brief description of the calculation will be given hereinafter. It should be noted, however, that such calculations cannot be made until the camera or other means by which images are acquired has been calibrated. One preferred method of calibration is that developed by Bowman & Forrest and disclosed in "Transformation Calibration of a Camera Mounted on a Robot," Image and Vision Computing, Vol. 5, No. 4, 1987, the teachings of which are incorporated herein by reference.

From FIG. 1, it is known that a point 10 $\underline{x}$=(x,y,z) in 3D space coordinates can be projected on to an image plan ($U_1$, $V_1$) resulting in an image point $\underline{u}$=($U_1$, $V_1$).

The transformation between 3D space and image space is a matrix $\underline{T}$ which represents the transformation as performed by the camera, and where:

$$(x,y,z,1)\underline{T}=(su,sv,0,x)$$

or $$e_x\underline{xT}=\underline{u}$$

The point P will be projected onto the two image planes forming an image point ($u_1$, $v_1$) in the first or left hand image and an image point $(u_2, v_2)$ in the second or right hand image. This can be expressed as:

$(x,y,z,1)\underline{T^l} = (s_1 u_1, s_1, v_1, 0, s_1)$ for the left hand view, and $(x,y,z,1)\underline{T^r} = (s_2 u_2, s_2, v_2, 0, s_2)$ for the right hand view where $\underline{T^l}$ and $\underline{T^r}$ are the transformation matrices for the left hand and right hand views respectively, i.e., the camera matrices.

The elements in $T^l$ and $T^r$ are as follows:

$$\underline{T^l} = \begin{vmatrix} T^l_{11} & T^l_{12} & 0 & T^l_{14} \\ T^l_{21} & T^l_{22} & 0 & T^l_{24} \\ T^l_{31} & T^l_{32} & 0 & T^l_{34} \\ T^l_{41} & T^l_{42} & 0 & T^l_{44} \end{vmatrix}, \quad (9)$$

$$\underline{T^r} = \begin{vmatrix} T^r_{11} & T^r_{12} & 0 & T^r_{14} \\ T^r_{21} & T^r_{22} & 0 & T^r_{24} \\ T^r_{31} & T^r_{32} & 0 & T^r_{34} \\ T^r_{41} & T^r_{42} & 0 & T^r_{44} \end{vmatrix} \quad (10)$$

The line 12 passes through $O_1 P$ can be expressed as $$O_1 P = \begin{vmatrix} X_1 \\ Y_1 \\ Z_1 \end{vmatrix} - \mu \begin{vmatrix} N_x \\ N_y \\ N_z \end{vmatrix}$$

where $(X_1 \; Y_1 \; Z_1 \; 1)\underline{T^l} = (0\;0\;0\;0)$.

$$N_x = \begin{vmatrix} (T^l_{21} - u_1 T^l_{24}) & (T^l_{31} - u_1 T^l_{34}) \\ (T^l_{22} - v_1 T^l_{24}) & (T^l_{32} - v_1 T^l_{34}) \end{vmatrix},$$

$$N_y = \begin{vmatrix} (T^l_{11} - u_1 T^l_{14}) & (T^l_{31} - u_1 T^l_{34}) \\ (T^l_{12} - v_1 T^l_{14}) & (T^l_{32} - v_1 T^l_{34}) \end{vmatrix}, \text{ and}$$

$$N_z = \begin{vmatrix} (T^l_{11} - u_1 T^l_{14}) & (T^l_{21} - u_1 T^l_{24}) \\ (T^l_{12} - v_1 T^l_{14}) & (T^l_{22} - v_1 T^l_{24}) \end{vmatrix}.$$

The epipolar line 16 can therefore be obtained by a direct transformation, namely $(X_1 - \mu N_x \; Y_1 - \mu N_y \; Z_1 - \mu N_z 1)\underline{T^r} = (s_2 u \; s_2 v \; 0 \; s_2)$ The projection of the first observation point $O_1$ gives the epipole $(u_e, v_e)$ in the second image and this is the point from which all the epipolar lines extend in the second image. The position of this epipole $(u_e, v_e)$ in the second image is found by letting $\mu = 0$ in the above equation. The equation for the epipolar line can then be expressed as $$\frac{(v - v_e)}{(u - u_e)} = \frac{(v_\mu - v_e)}{(u_\mu - u_e)}$$

where $u_\mu$ and $v_\mu$ are obtained by letting $\mu$ equal an integer constant.

Once epipolar lines have been defined in the or each other image, the images can be processed to identify features by applying various constraints to the images. In other words, the processing is arranged to look for similarities between a point in the first image and points selected by the identification of epipolar lines in the second and any subsequent images.

As mentioned above, in this embodiment edge pixels (edgels) are used as the image primitive to be matched. Edges are therefore first identified in the images. The preferred method of edge detection is that developed by Marr and Hildreth as modified in the system disclosed in the above-mentioned international patent application, though other known methods could be used instead. Once edgels have been thus identified, an orientation constraint is applied to each edgel to facilitate identification of corresponding edgels.

For an edgel in a segment, the orientation of the edgel has a slightly different meaning to that of a line segment. The present embodiment uses local edge orientation to refer to the tangent to a local edge segment at an edgel $(u,v)$. Each edgel has two directional first derivatives of intensity, $G_v$ and $G_u$, where the gradient $G(u,v)$ of the intensity I of an edgel is $Gv + Gu$ and $$G(u,v) = \frac{\partial I(u,v)}{\partial u} + \frac{\partial I(u,v)}{\partial v}.$$

$G_v$ and $G_u$ are obtained from a gradient operator, such as the so-called Sobel or the Canny operators. The local edge orientation of an edgel is expressed by $$\tan^{-1} \left| \frac{G_v}{G_u} \right|$$

and, since the local edge orientation is susceptible o both geometric distortion and image noise, this constraint is used to filter the obvious false matches by restricting the orientation difference between the matching edgels to a limit of $\pm 4/\pi$. This limit can be varied accordingly to the viewing angle. This constraint is then applied between images 1 and 2 as follows.

$$0 \leq \tan A = \left| \frac{G_{v1} G_{u2} - G_{v2} G_{u1}}{G_{u1} G_{u2} + G_{v1} G_{v2}} \right| < 1$$

where $G_v$ and $G_u$ are the vertical and horizontal gradients of the image intensity at an edgel.

Thus, one way in which the system can look for similarities between images is to examine the gradient of an edgel in one image and to compare that gradient to the respective gradients of edgels identified by the epipolar line in another image.

Figure 3:
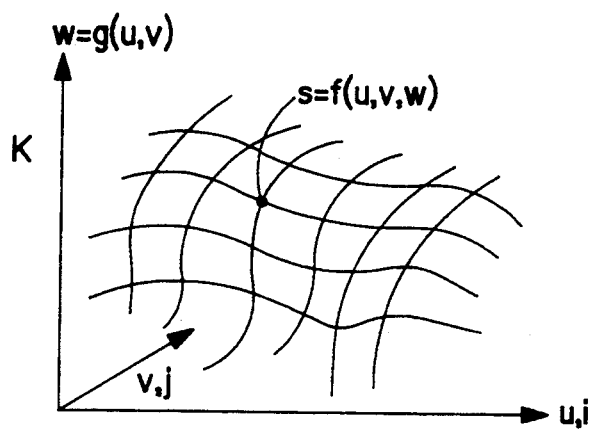
FIG. 3 is a graphical representation of an intensity contour.

Another constraint that can be applied is to examine the intensity normal of edgels. FIG. 3 of the accompanying drawings shows an intensity profile K of an image in the image plane. For a point S in the image plane, where $S = f(u,v,w)$ and $w = g(x,y)$, there will be an intensity normal vector $\underline{B_n}$, where $\underline{B_n} = a\underline{i} + b\underline{j} + c\underline{k}$. The position of the point S is given by a position vector $\underline{r}$, where $\underline{r} = u\underline{i} + v\underline{j} + w\underline{k}$ and from this $\underline{B_n}$ can be calculated.

The gradient in u for the position $\underline{r}$ is given by $$\frac{\partial \underline{r}}{\partial v} = \underline{i} + \frac{\partial w}{\partial u} \underline{k}$$

and the gradient in v is given by $$\frac{\partial \underline{r}}{\partial v} = \underline{j} + \frac{\partial w}{\partial u} \underline{k}$$

Therefore, $\underline{B}_n = \dfrac{\frac{\partial \underline{r}}{\partial u} \times \frac{\partial \underline{r}}{\partial v}}{\left| \frac{\partial \underline{r}}{\partial u} \times \frac{\partial \underline{r}}{\partial v} \right|}$ It should be noted that the processing can be simplified where the above discussed gradient constraint is applied because $$\frac{\partial w}{\partial u} \text{ and } \frac{\partial w}{\partial v}$$

are in fact the above discussed $G_u$ and $G_v$, respectively.

Figure 4:
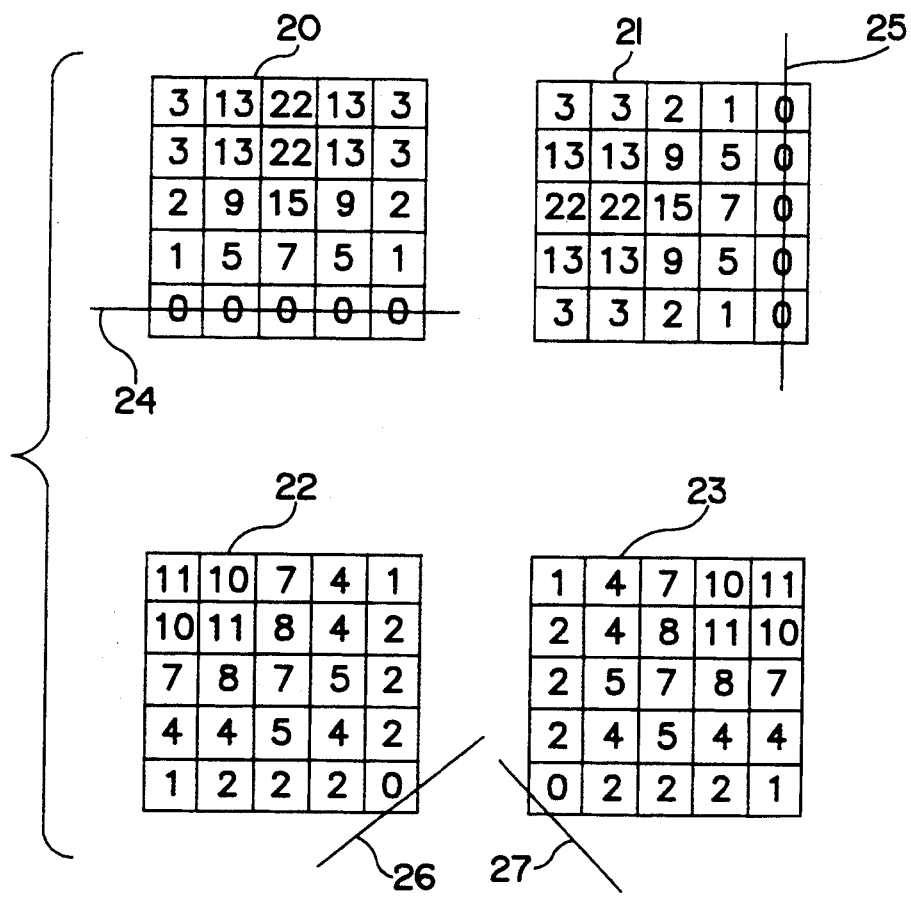
FIG. 4 shows masks suitable for extracting colors across an edge.

An edgel may also be characterized by a sharp transition of color as well as or instead of intensity. The colors on each side of a detected edge are calculated using specially designed orientation masks, as shown in FIG. 4 of the accompanying drawings. The function of the masks is to obtain a representative color value on each side of an edge, and four orientation masks 20,21,22,23 are derived from, for example, a weighted half-Gaussian kernel. At least four orientation masks are required to cover the eventuality of the detected edge having an orientation approximately to horizontal, as shown by edge 24, vertical as shown by edge 25, inclined left to right as shown by edge 26 and inclined right to left as shown by edge 27. For edges having orientations different from those shown, additional masks can be used or the mask corresponding to the approximate orientation can be selected. The center, i.e., the maximum weighting of the kernel, is placed approximately 4 pixels away from the edgel in the image, and therefore the weights decrease nearer to the edge. The masks are applied symmetrically about the edge and are applied repeatedly for each edgel in the edge.

In this way a representation of the colors on each side of the edge is built up.

The luminance or intensity L of a pixel/edgel is calculated from $L = R + G + B$, where R, G, B are the three primary color components of the pixel. R, G and B can be normalized to r, g, b as follows:

$$r = \frac{R}{L} \quad g = \frac{G}{L} \quad \text{and} \quad b = \frac{B}{L}$$

Only r and g need to be calculated because $r + g + b = 1$ and b can be calculated readily from r and g. A color vector c is then calculated from $\underline{c} = a\underline{r} + b\underline{g}$ and thus, colors on each side of the edge are represented by a color vector in normalized color coordinates. Vector subtraction is then used to compare the color similarity between an edgel in one image and potential candidate edgels in the other image. A difference limit $\epsilon$ is used to accept potential matches. The difference limit $\epsilon$ is defined as $$|\underline{c}_a - \underline{c}_b| < \epsilon$$

In order to handle an occlusion situation, i.e., a feature in one image being obscured by another feature in the other image, color matches should not be imposed on both sides of the edge. The requirement therefore is that at least one side of potential matching edgels should have the same color.

If edgel matching is limited to a local comparison, ambiguities can arise. Such ambiguities can be reduced by using the edge segment along which a disparity continuity constraint usually applies. This constraint comes from the assumption that a continuous edge in 3D space gives rise to a continuous edge in the image. This implies that the disparity value varies smoothly along a continuous edge. This is the coherence principle proposed by Prazdny in his paper "Detection of Binocular Disparities": Biological Cybernetics 52: 93–99, 1985. It should be noted that a continuous edge in an image may not necessarily come from just one edge in 3D space, and hence there may be discontinuities of disparity along a continuous edge in the image. Particular attention should therefore be paid to this point when a disparity discontinuity constraint is applied to edgel matching. Once an edge has been identified in an image and for each edgel in that image potential corresponding edgels in another image have been selected, a final selection must be made to identify corresponding edgels in the two images on a one-to-one basis. In other words, an edgel in the second or any other image must be uniquely defined as that corresponding to an edgel in the first image.

Stereo matching techniques would usually produce more than one acceptable match, even when all of the constraints described hereinabove are applied to an undecided edgel. The requirements for matching uniqueness dictates that only one must be selected from these acceptable matches, and the correspondence problem thus can be considered as a combinatorial optimization problem. A potential matching candidate will satisfy the following constraints:

1. The matched pixels or the matching entities will all lie on the respective epipolar lines, or, in the case of more than two views, at the intersections of the respective. epipolar lines.
2. There will be a similarity of image attributes between all the matched entities.
3. A continuous 2D edge segment will usually correspond to a continuous edge segment whether it is a physical edge or an edge segment resulting from a shadow. The disparity continuity constraint can then be applied.

It is possible to formulate a measure which reflects the quality or goodness of match of different potential candidates based on the above three criteria, and this measure is used to seek a combination of the potential candidates which will give the 'best' measure.

The coherence principle requires that disparities of the neighboring elements corresponding to the same 3D object be similar, i.e. neighboring image points corresponding to the same object should have nearly the same disparities. The Markov Random Field (MRF) image model, proposed by Geman and Geman in their paper "Stochastic Relaxation, Gibbs Distributions and the Bayesian Restoration of Images", IEEE Transactions on Pattern Analysis and Machine Intelligence, Vol. PAMI-6, pp. 721–741, November 1984, is therefore also applicable in stereo matching. Using the MRF model, matching adjacent edgels on an edge segment is an interdependent process, as the disparities between these edgels must be similar. The MRF model quite often leads to the use of a simulated annealing algorithm which usually takes a larger amount of time to arrive at near optimal matching configurations. Simulated annealing will only be suitable if the solution space is very large and where a deterministic algorithm would also run into time and space problems. If more than two views are used, the application of the similarity and the epipolar line constraints will give a very confined solution space where a deterministic optimization algorithm can be used in preference to a stochastic one.

Although the MRF is best understood as a markov chain with transition probabilities for each edgel, the goodness measure can be applied in such a way that the goodness of match of an edgel depends not only on the combinations of potential candidates for itself but also on those of its neighbors. In this way, edgel-segment matching, which is a compromise between matching ambiguity and the generality of the matching algorithm, can be used to preserve the advantages of edgel matching and reduces the matching ambiguity using the disparity continuity constraint. This measure is then the transition probability in a different guise, and, in the framework of optimization, this measure of goodness of match is known as the cost function.

The above discussed local edge orientation and intensity normal at a corresponding edgel vary from image to image due to the change of viewing position. The above discussed color match constraint requires calculation of the color value on each side of an edge using masks with a certain size of support, and it therefore suffers from foreshortening effects due to a wide baseline or wide viewing angle. Therefore, these similarity constraints can neither be minimized nor maximized. They can however, determine whether a potential matching should be considered. The cost function C in canonical form can then be formulated as:

$$C_{i,i+1}\ canonical = \frac{\sum_{j=2}^{n} d_j + \beta \sum_{j=2}^{n} \Delta D_j}{2}$$

where $S = f(\underline{c}, N, \tan A)$ and,
$\begin{cases} S = 1 & \text{if the similarity constraints are satisfied} \\ S = 0 & \text{otherwise} \end{cases}$ and where $\underline{c}$, N and tan A are respectively the above discussed color vector, the intensity normal, and the local edge orientation, n is the total number of views, $d_j$ is the sum of distances of potential matches from the epipolar line (j=2) or from the intersections of the epipolar lines (j>2) for the i th and i+1 th edgels in a segment, $D_j$ is the change of disparities between neighbouring pixels (the i th and the i+1 th edgel in a segment, and $\beta$ is a weighting factor.

It should be noted that the cost reflects the goodness of match of two neighboring edgels. If the similarity constraints are applied to filter the obvious false matches, the cost function will be simplified to $$C_{i,i+1} = \sum_{j=2}^{n} d_j + \beta \sum_{j=2}^{n} \Delta D_j$$

The optimization constraints are then reduced to the distances from the epipolar lines and intersections of epipolar lines and change of disparities between neighboring edgels only. We want a combination of matches for edgels along a segment that will give $$C_p = \min \left| \sum_{i=1}^{l-1} (C_{i,i+1}) \right|$$

The solving of this equation will give a solution that is both globally and locally optimal. This will be better understood by reference to FIG. 5. For a continuous edge segment containing 1 edgels, each edgel will find $p_i$ potential candidates, and a layered network of layers can be constructed with $p_i$ nodes in each layer of the network. Cost paths 30,31,32 can then be generated for each node across the layers of the network. The paths are unidirectional from the ith layer to the i+1th layer and paths between the same layer are forbidden.

The paths 30,31,32 connecting two nodes are associated with a weight which reflects the cost for choosing each node as a match for the respective edgels. This cost is obtained using the above discussed simplified cost equation for $C_{i,i+1}$. The complexity of the network is indicated by the number of nodes and the number of paths connecting the nodes. The total number of nodes is given by $$\sum_{i=1}^{l} p_i.$$

The number of arcs is given by $$\sum_{i=1}^{l-1} p_i(p_{i+1}).$$

The aim is therefore to find a route which will give the minimum cost from the first edgel (i=1st layer) to the last edgel (i−1th layer) of the segment, i.e., a node in the first layer to a node in the last layer. In other words, once the network has been created, finding the solution is a shortest path problem.

Various shortest path algorithms have been developed and are well known, and any efficient shortest path algorithm can be used that finds the shortest path from a node to another node, or from a node to all other nodes. It has been shown that the so-called linked double ended queue (L-deque) data structure and the peculiar label updating policy designed by Pape and disclosed in ACM Transactions on Mathematical Software 6,450,1980 Algorithm 562, is one of the fastest on layered graphs and is also one of the easiest to implement. The algorithm is well known, and no further explanation is required, but the reasons why this algorithm is chosen for stereo matching are as follows. The memory requirement of the L-deque algorithm is 4n+2m, where n is the number of nodes and m is the number of arcs. The computational cost is approximately linear with the number of layers in the graph. There is no threshold value to be adjusted as there is in some of the other algorithms for layered graphs. Also, we have found by experimentation that the algorithm is inherently capable of handling disparity discontinuities in edge segments resulting from depth discontinuities in a scene. This enables a continuous segment to be broken up or several short segments to be joined together arbitrarily for the purpose of processing, though a minimum of about 10 edgels is required to ensure correct correspondence. Since the segment can be easily broken up, the process is particularly well suited to execution in parallel processors, thereby increasing the speed at which the process is performed.

The L-deque algorithm calculates the shortest path from a chosen node to all other nodes in the network. Therefore, the L-deque algorithm has to be used $p_1$ times to obtain the shortest of the $p_1$-shortest paths. The computational cost for such a task will be $p_1*t$ where $t$ is the time required to calculate the shortest path from a node in the first layer to the nodes in the last layers as represented by FIG. 6 of the accompanying drawings. A dummy 0th layer and a dummy $l+1$ layer with one node in each layer can be introduced into the network. Introducing these dummy layers increases the network complexity by two nodes and by $p_1+p_l$ arcs, but reduces the number of calculations of the shortest path to only one. This, in general, results in considerable reduction of the computational cost.

Once corresponding edgels have been identified between images, edgels are grouped together by an 8-connectedness criterion using an iterative edge labelling algorithm. In this way, segments of edges are obtained and a matching algorithm is then used to obtain a sparse 3D map of the scene. The matching algorithm is shown in FIG. 7 and is self explanatory.

During the matching of a segment or a subsegment, only information about the matching edgels is needed. Therefore, the algorithm can be run on a network of processors in parallel and communication between processors is unnecessary. A group of edgels forming a matching segment can come from a single continuous edge segment or several concatenated edge segments or a section of a long edge segment. The computation time of the algorithm is approximately linear with the length of the matching segment. The lengths of all the matching segments can be made the same for each processor so that the time taken for matching on all processors is approximately similar.

Figure 8:
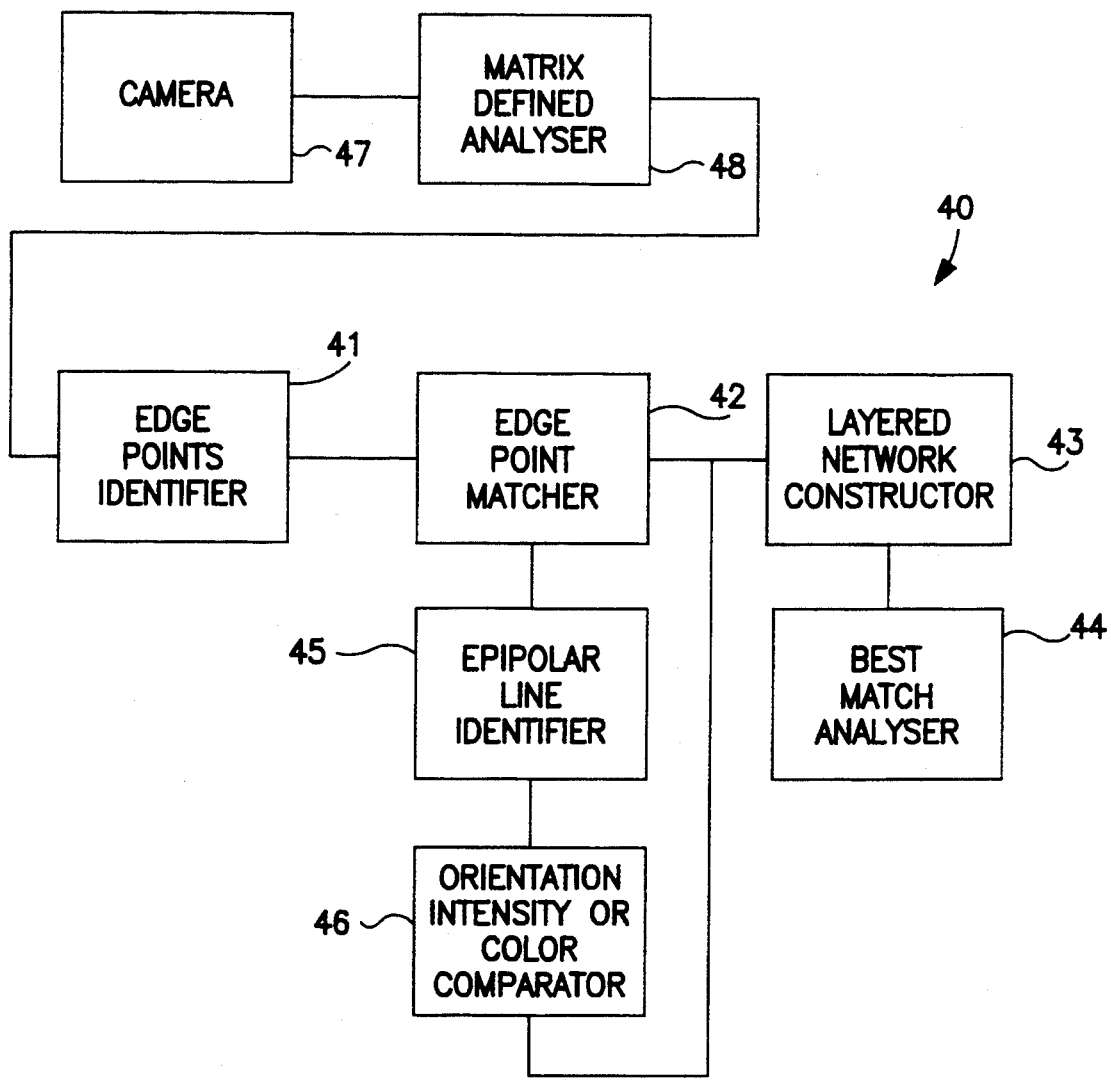
FIG. 8 as a block diagram showing a system for matching corresponding features in at least two different images embodying the present invention.

Referring to FIG. 8, a system 40 for matching corresponding features in at least two different images of a scene is shown which embodies the present invention. The system 40 essentially comprises: an edge points identifier 41 for identifying a plurality of edge points in each image that form a continuous edge segment; an edge point matcher 42 for identifying potentially matching edge points in two images by applying predetermined matching constraints to the identified edge points; a layered network constructor 43 for constructing for each edge segment in one image a layered network of potentially matching edge segments in the at least one other image; and a best match analyser 44 for carrying out a shortest path analysis of layered network to determine the best match between segments. The constructor 43 produces a layered network such as that shown in FIG. 5. In addition, the system 40 also includes an epipolar line identifier 45 for identifying epipolar lines in each other image corresponding to an edge point in one image. Also an orientation, intensity or color comparator 46 for comparing at least one of the local edge orientation, the intensity normal and the surrounding color of the edge points in one image and the potential matches in the other images is provided. Furthermore, the system 40 also includes a camera 47 and a matrix defined analyser 48 which incorporates a matrix defining parameters relating to the capture of the images.

I claim:

1. A method of matching corresponding features in at least two different images representing a scene, the method comprising:
    (a) identifying in each image plural edge points which together form a continuous edge segment in the image;
    (b) identifying potentially matching edge points in said at least two images by application of predetermined matching constraints to the plural edge points identified in each image;
    (c) constructing for each edge segment in one image a layered network of potentially matching edge segments in the or each other image, said layered network identifying for each edge point in the continuous edge segments of said one image potentially matching edge points in the or each other image; and
    (d) identifying the best match between segments on the basis of a shortest path analysis of the layered network.

2. A method as claimed in claim 1, wherein, for each edge point in the one image, potentially matching edge points are identified as those edge points lying along a corresponding epipolar band in the or each other image.

3. A method as claimed in claim 2, wherein potentially matching edge points are identified as those edge points lying along a corresponding epipolar line in the or each other image.

4. A method as claimed in claim 3, further comprising identifying in a third image a first epipolar line corresponding to the edge point in the one image; identifying a second epipolar line corresponding to the epipolar line in the said other image; and identifying the point at which the first and second epipolar lines intersect as a potentially matching edge point.

5. A method as claimed in any one of claims 2 to 4, wherein further matching constraints are applied to the points identified as potential matches in order to facilitate the identification of potential matches in the or each other image to the point in the one image.

6. A method as claimed in claim 5, wherein the further constraints include comparing at least one of the local edge orientation, the intensity normal and the surrounding color of the edge points in the one image and the potential matches in the or each other image.

7. A method as claimed in claim 6, wherein the comparison of the surrounding color comprises comparing the color vector of each edge point in the one image with the color vector of potentially matching points in the other image.

8. A method as claimed in claim 7, wherein the color vector is determined by applying an orientation mask to image points in the vicinity of the point in each image under comparison.

9. A method as claimed in claim 6, wherein the intensity normal is calculated from a gradient operator.

10. A method as claimed in claim 1, wherein images are captured by camera, each image having an associated camera matrix defining parameters related to the capturing of the image.

11. A method as claimed in claim 10, wherein the camera matrix is calculated for each captured image after an initial calibration of the camera.

12. A method as claimed in claim 1, wherein the shortest path analysis applies to each potential matching edge point a weighting representing the likelihood of the potential point matching the selected point and selects as the best match to the selected point the point which results in a minimal weighting.

13. A method as claimed in claim 12, wherein the weighting that is applied is dependent on the result of the application of said predetermined matching constraints to the plural edge points identified in each image.

14. A system (40) for matching corresponding features in at least two different inages representing a scene, the system comprising:
  (a) means (41) for identifying in each image plural edge points which together form a continuous edge segment in the image;
  (b) means (42) for identifying potentially matching edge points in said at least two images by application of predetermined matching constraints to the plural edge points identified in each image;
  (c) means (43) for constructing for each edge segment in one image a layered network of potentially matching edge segments in the or each other image, said layered network identifying for each edge point in the continuous edge segments of one image potentially matching edge points in the or each other image; and
  (d) means (44) for identifying the best match between segments on the basis of a shortest path analysis of the layered network.

15. A system (40) as claimed in claim 14, further comprising means 45 for identifying in each other image epipolar lines corresponding to each edge point in the one image.

16. A system as claimed in claim 15, further comprising means (46) for comparing at least one of the local edge orientation, the intensity normal and the surrounding color of the edge points in the one image and the potential matches in the or each other image.

17. A system (40) as claimed in any one of claims 14 to 16, further comprising a camera (47) for capturing said images and matrix defining means (48) for defining a matrix defining parameters relating to the capturing of the image.

18. A system (40) as claimed in claim 14, wherein the shortest path analysis applies to each potential matching edge point a weighting representing the likelihood of the potential point matching the selected point and selects as the best match to the selected point the point which results in a minimal weighting.

19. A system (40) as claimed in claim 18, wherein the weighting that is applied is dependent on the result of the application of said predetermined matching constraints to the plural edge points identified in each image.

* * * * *